United States Patent Office 3,158,319
Patented Nov. 24, 1964

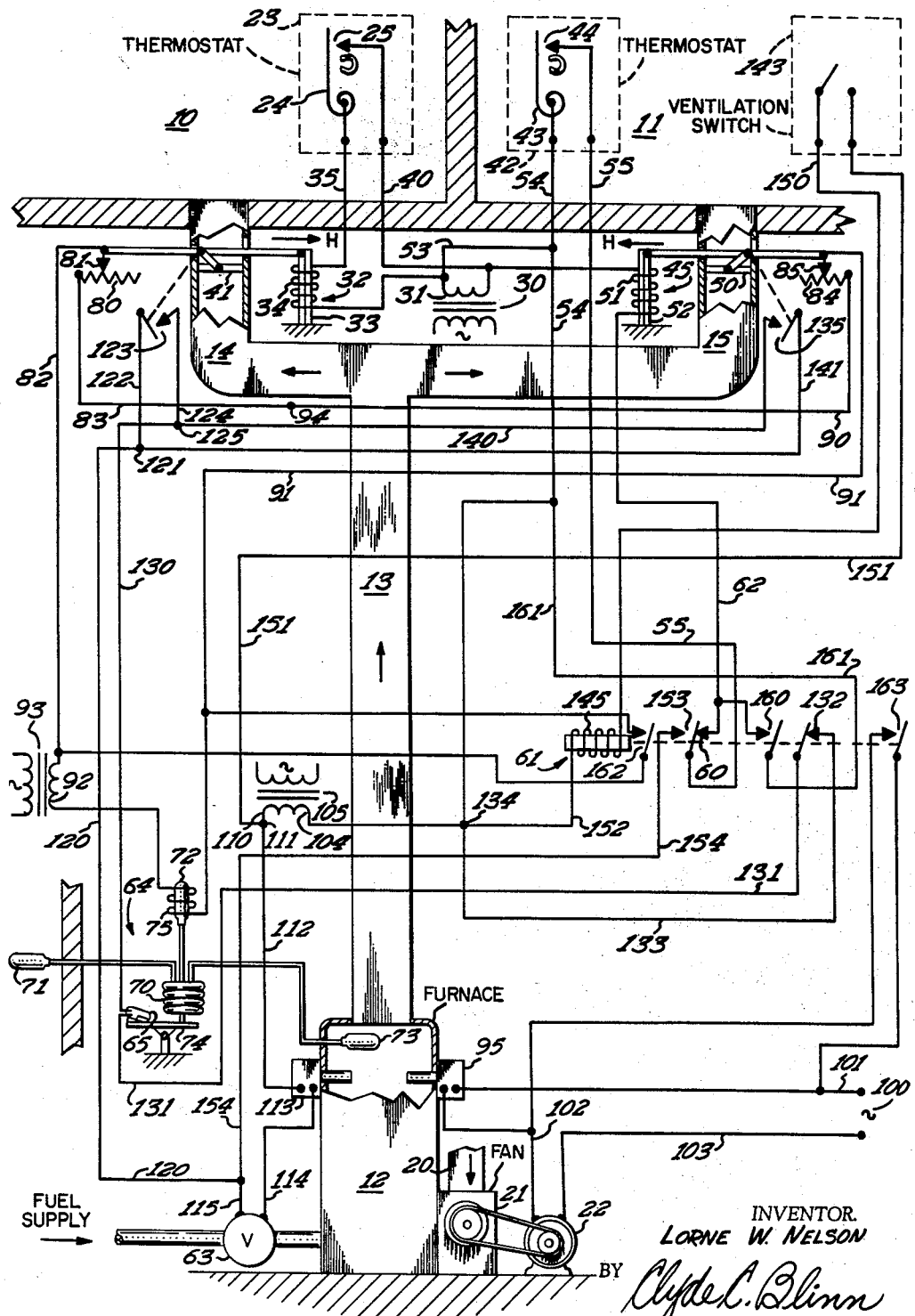

3,158,319
CONTROL APPARATUS
Lorne W. Nelson, Bloomington, Minn., assignor to
Honeywell Inc., a corporation of Delaware
Filed Mar. 25, 1963, Ser. No. 267,687
4 Claims. (Cl. 236—9)

The present invention is concerned with an improved zone temperature control system for a forced air heating installation; in particular, the improvement is in the control of the temperature of the air when the system is shifted from a zone control system to a single zone system and back for the purposes of improving the ventilation in one of the zones.

Zone control systems for heating and cooling have been available for many years. In such systems, a room thermostat located in a representative place in each of the zones is used to control the flow of air or a damper in the duct through which air is delivered to that zone from the furnace. With the advent of air cleaning, the need for constant circulation of the air to the zones regardless of whether there is a need for heating or cooling is more desirable. With zone control systems, constant air flow can be obtained by expensive changes in the duct work which has not been generally accepted.

In the Hubert T. Sparrow Patent 2,805,026, a zone temperature control system is shown. In this system, zone damper motors are controlled by a zone thermostat to select the amount of heated air which is delivered to the zone to maintain the temperature at some predetermined value. A heat scheduling apparatus is used to maintain the temperature of the furnace and thus the air leaving the furnace at a level depending upon various conditions. One of the conditions is the total flow of air to all of the zones. When all of the zones are calling for the supply of heated air, the furnace temperature is allowed to increase to deliver warmer air than would be the case if only one zone were calling for the supply of heated air.

In the Lorne W. Nelson Patent 3,074,643, a ventilation cycle is provided for a zone control system of the type shown in the Sparrow patent. The ventilation cycle provides for the transfer of the zone system to a single zone system upon the operation of a ventilation switch in the primary zone. In this manner, the primary zone thermostat is connected to control the furnace or burner. A constant delivery of air to the zones can be provided without any overheating as the temperature of the air is determined by the primary zone thermostat and not any other conditions such as the total quantity of air flow as is the case in the Sparrow patent.

With the combination of the inventions of the Sparrow patent and the Nelson patent into a zone control system for providing the ventilation cycle, certain objectionable conditions were developed. With a heat scheduling means such as shown in the Sparrow patent for determining the temperature of the air being delivered from the furnace in response to the total quantity of air delivered to all of the zones, the heat scheduling control was found to adjust the temperature setting to some high value when the system was placed on its ventilation cycle and all of the damper motors were driven wide open for a maximum ventilation. Upon the transfer of this system back to a zone control system, the high setting of the furnace temperature for the zone control operation caused the furnace to deliver air at a temperature much higher than needed in any of the zones and the zone temperature was found to overshoot. The overshooting condition would take place each time the system was transferred from the ventilation cycle to a zone control operation.

The present invention inactivates the control means which maintains the furnace temperature during the zone control operation each time the system is transferred to the ventilation cycle or single zone operation whereby upon the transfer back to the zone control system, the furnace temperature is not allowed to be increased to a value higher than that needed to maintain an adequate supply of heated air to the zones for good temperature control.

Therefore, an object of the present invention is to provide an improved temperature control system for zone control in which a normal heat scheduling control used during the zone control operation is rendered inactive when the zone control system is transferred to a single zone system for ventilation purposes.

Another object of the present invention is to provide a furnace temperature control for controlling the temperature in accordance with a plurality of conditions with means for rendering the furnace temperature control ineffective when a zone temperature control system controlling the temperature in a plurality of zones to which the furnace is connected is transferred to a single zone system for ventilation purposes.

These and other objects will become apparent upon a study of the following specification and drawing, of which:

The single figure is a schematic representation of a zone control system having a furnace temperature control which is rendered inactive when the zone control system is transferred to a single zone system for ventilation purposes.

Referring to the single figure, a zone temperature control system is shown for supplying conditioned or heated air to a plurality of zones 10 and 11. Conditioned or heated air is supplied to zones 10 and 11 from a furnace 12 through a supply duct 13 which is divided to supply air through ducts 14 and 15 connected to the respective zones 10 and 11. A return duct 20 has a fan 21 which is driven by a motor 22.

For normal zone control, a thermostat 23, having a bimetal 24 for controlling a switch 25, controls the temperature in zone 10. A source of power 30 has a step-down transformer 31. Thermostat 23 is connected to control a conventional motor such as shown in the Bielski Patent 2,509,471. Motor 32 has a bimetal 33 which is heated by a heater 34. Heater 34 is connected to secondary 31 by a circuit through thermostat 23 traced as follows: from heater 34, conductor 35, switch 25, conductor 40, secondary 31, and back to heater 34. Upon the closing of switch 25, heater 34 is energized to move bimetal 33 to the right to open a damper 41 located in duct 14 to increase the quantity of air flow to zone 10.

A similar thermostat 42 in zone 11 has a bimetal 43 and a switch 44. A motor 45 similar to motor 32 is connected to damper 50 in duct 15. Upon a heater 51 being energized, a bimetal 52 of motor 45 moves to the left to open damper 50. Heater 51 is connected to secondary 31 by a circuit including thermostat 42 traced as follows: from secondary 31, a conductor 53, a conductor 54, switch 44, a conductor 55, a normally closed switch 60 associated with a relay 61, a conductor 62, winding 51, and back to the other side of secondary 31.

Furnace 12 has a burner to which fuel is supplied through a conventional controller or solenoid valve 63. When the temperature control system is connected as a zone control system, valve 63 is controlled by a heat scheduling controller or condition operating switch means 64. Controller 64 is of a type disclosed in FIGURES 1 and 3 of the Sparrow patent. A conventional mercury switch 65 is moved in response to the output of a bellows or pressure responsive device 70 which has three bulbs 71, 72, and 73 connected thereto in a liquid filled system. In order to open switch 65, the temperature of bulb 73 must reach some predetermined value depending upon other conditions which determine the temperature of bulbs 71 and 72. Bulb 71 is located outdoors to respond to outdoor temperature whereby the outdoor temperature, which is a means of determining the heat load of the zones, adjusts the air temperature of the furnace by regulating the temperature at which bulb 73 will result in the tipping of lever 74 in a clockwise direction to open switch 65. A temperature controller of this type is presently on the market for use in zone control systems; however, the present invention could use other arrangements for scheduling the furnace temperature in response to conditions indicative of the need of heated air in the zones.

Bulb 72 is heated by a heater 75 to readjust the furnace temperature by another condition which is indicative of the total flow of air to all the zones. A potentiometer winding 80 having a movable wiper 81, which is connected to damper 41, adjusts the resistance between conductors 82 and 83 depending upon the position of damper 41. A similar potentiometer having a winding 84 and a wiper 85 adjusts the resistance between conductors 90 and 91 depending upon the position of damper 50 which is connected to wiper 85. The energization circuit for heater 75 includes the resistance of the two mentioned potentiometers and can be traced as follows: from a step-down secondary winding 92 of a source of power 93, conductor 82, conductor 83, terminal 94, conductor 90, conductor 91, heater 75, and back to the other side of secondary 92. As dampers 41 and 50 open to increase the total flow of air to the zones, wipers 81 and 85 move across the respective windings 80 and 84 to increase the resistance in the circuit supplying voltage to winding 75. A decrease in the current to heater 75 increases the temperature scheduled for bulb 73 at a predetermined outdoor temperature whereby hotter air is delivered to the zones as the quantity of air needed increases.

The control of the furnace fan is normally accomplished by a conventional fan temperature control 95, which is connected in the fan motor control circuit traced as follows: from a source of power 100, a conductor 101, fan control 95, a conductor 102, motor 22, and back to the other side of the source of power through conductor 103. Upon an increase in the temperature of the furnace to some predetermined value as determined by fan control 95, the fan is placed in operation to deliver the conditioned air to the zones.

Normal control of the furnace during the zone control operation is accomplished by the energization of the valve 63 when switch 65 closes through a circuit traced as follows: from a secondary winding 104 of a source of power 105, a conductor 110, a terminal 111, a conductor 112, a conventional high limit temperature control 113 which opens the circuit when the furnace temperature reaches some high value for safety purposes, a conductor 114, solenoid valve 63, a conductor 115, a conductor 120, terminal 121, a conductor 122, switch 123 which is normally open and closes when damper 41 begins to move toward an open position, a conductor 124, a terminal 125, a conductor 130, switch 65, a conductor 131, a normally closed switch 132 which is associated with relay 61, a conductor 133, a terminal 134 and back to the other side of the source of power 104. Connected in parallel with switch 123 is a switch 135 which is normally open and closes when damper 50 moves from the closed position toward the open position. Switch 135 is connected between terminals 125 and 121 by conductors 140 and 141, respectively.

A ventilation switch 143, which might be located in one of the zones, such as 11, is connected to control the energization of relay 61 by a circuit traced as follows: from a winding 145 of relay 61, a conductor 150, switch 143, a conductor 151, terminal 111, secondary 104, terminal 134, a conductor 152, and back to winding 145. When switch 143 is closed, relay 61 is energized. Upon the transfer to the ventilation cycle by the operation of switch 143, thermostat 42 is connected to control the operation of valve 63 directly and controller 64 is rendered inactive so the delivery of the air to the zones 10 and 11 is provided as a single zone system with single thermostat 42 located in one of the zones. To allow air flow to zone 11, damper 50 is driven open. Zone 10 will receive air flow depending upon the need of heat in the zone since zone thermostat 23 still controls the position of damper 41. When switch 60 opens and switch 153 closes, valve 63 is connected directly to thermostat 42 through a circuit traced as follows: from secondary 104, terminal 134, conductor 54, switch 44, conductor 55, switch 153, a conductor 154, conductor 115, valve 63, conductor 114, control 113, conductor 112 and 110 back to the source of power 104. Motor 45 is energized to drive damper 50 wide open by a circuit traced as follows: from winding 51 of the motor, conductor 62, switch 160, a conductor 161, a conductor 54, a conductor 53, secondary 31, and back to the other side of winding 51. At the same time, relay 61 is effective to apply full voltage to heater 75 to reduce the control point of temperature control 64 by shorting out windings 80 and 84 when switch 162 closes to connect conductors 82 and 91 and apply the secondary winding 92 directly to heater 75. To have maximum ventilation a constant fan operation may be desired. Switch 163 which is closed when relay 61 is energized is connected to shunt out controller 95 and connect the motor 22 directly to power source 100.

*Operation*

As shown with power supplied to each of the power sources, the zone control system is operating in a normal manner. Upon a call for heat by either one of the thermostats, the respective zone damper motors are energized to open the dampers and close the control switches 123 or 135 to provide for energization of the furnace through controller 64. A temperature output of the furnace is established depending upon the outdoor temperature and the temperature of bulb 72. As the dampers increase the delivery of air to the zones, the total flow of air determines the furnace output temperature by changing the resistance of windings 80 and 84 which are connected in the heater circuit 75. For example, with both of the thermostats calling for maximum heat, dampers 50 and 41 would be wide open and a maximum resistance of resistors 80 and 84 would be connected in the heater circuit 75 so the temperature of controller 64 would not be depressed by the heater output. In this manner, a maximum furnace output temperature would be available for the particular outdoor temperature as sensed by bulb 71.

Should a ventilation cycle be desired which might take place if a number of people were gathered in zone 11, switch 143 can be closed. Without such a ventilation cycle, the thermostat 42 would become satisfied and air flow to zone 11 would be cut off. For best comfort, the air flow to zone 11 with a large gathering in the zone should be at a maximum level. Thermostat 42 is thus connected to control the furnace output directly so that even though the maximum air flow is delivered to zone 11, the temperature will not exceed a predetermined value as selected by the thermostat. When switch 143 is closed and relay 61 is energized, theremostat 42 is connected to control valves 63 directly and the fan is placed on continuous operation. At the same time, damper 50 is driven wide open and damper 41 is maintained under control of thermostat 23.

To prevent controller 64 from being upset since dampers 41 and 50 may move wide open and the maximum resistance of resistors 80 and 84 would be connected into the heater circuit 75, the controller 64 is depressed or rendered inactive by means of switch 162 when relay 61 is energized. A maximum voltage or current is applied to heater winding 75 to depress the control point of controller 64; however, since the controller does not have any function during the ventilation or single zone operation, the output of the furnace is not affected thereby.

Under the single zone operation, the thermostat 42 would maintain the primary control and the temperature in zone 11 would remain at the selected value with a maximum air flow to the zone. Upon a change back to the zone control system, which might take place after the large gathering of people in zone 11 left, switch 143 is opened by the occupant and relay 61 is de-energized. With this operation, thermostat 42 is placed in control of the damper and if the thermostat is still not satisfied, damper 50 may remain open. In most cases, as mentioned before, dampers 41 and 50 would be wide open and a maximum resistance from resistors 80 and 84 would be connected into the heater circuit 75. With switch 162 no longer closed, the heat is immediately removed from bulb 72 and the control point of controller 64 is increased to allow the furnace temperature to be much higher. In such systems, depending upon the time constant of the system as would be a function of the speed of operation of motors 32 and 45, the furnace temperature may ride to some high value determined by controller 64 to deliver very hot air to zones 10 and 11 before the zone damper motors 32 and 45 would have an opportunity to close the dampers. Obviously, by means of the switch 162, the depression of the control point of controller 164 eliminates this adverse condition.

Let us assume that the control point of controller 64 was not depressed during the ventilation or single zone operation, if the controller 64 were allowed to be adjusted by the amount of resistance from resistors 80 and 84 in the circuit of heater 75, a minimum heat would be supplied to heater 75 and the control point of controller 64 would be quite high. Upon the transfer back to the zone operation, a certain amount of time would be necessary to bring controller 64 back into the normal operation by the application of heat to bulb 72. Until that time took place, controller 64 would allow the burner to operate to maintain a relatively high furnace temperature. Such a high furnace temperature could result in an overshooting condition of the temperature in zones 10 and 11 before the system stabilized.

While the invention has been described in one particular manner, the intent is to limit the scope of the invention only by the scope of the appended claims, in which I claim:

1. In a temperature control system, a furnace for supplying a quantity of conditioned air to a plurality of spaces, a plurality of conduit means connecting said furnace and each of said spaces, a source of power, temperature responsive means in each space, flow control means in each of said conduit means leading to each space, motor means for driving each of said flow control means, said motor means being controlled by its respective temperature responsive means, pressure actuated switch means having an outdoor temperature responsive bulb and a furnace temperature responsive bulb connected thereto in a liquid filled system, said switch means having an operating relationship to operate at a furnace temperature depending upon the outdoor temperature, an electric heater connected to said liquid filled system to vary said operating relationship by heating a portion of said liquid in said system, a plurality of variable resistance means each of which is adjusted by its respective motor means in relation to the flow of a position of said flow control means, connection means including said vairable resistance means for connecting said heater to said source of power whereby upon a decrease in flow of air to said spaces said heat applied to said system by said heater is changed to re-establish said liquid temperature for a given outdoor temperature, a ventilation switch, relay means, means connecting said ventilation switch to control the energization of said relay means, and circuit means connected to said relay means to connect one of said space temperature means to control said furnace to transfer the system to a single space system, to simultaneously shunt said resistor to apply a maximum current to said heater, and to energize said motor to open said flow control means whereby upon a transfer of the system back to a zone system said temperature changing means has a depressed temperature to prevent overshooting of the space temperature while said flow control means are readjusted depending upon said space temperature responsive means.

2. In a temperature control system, temperature changing means for supplying a quantity of conditioned air to a plurality of spaces, a plurality of conduit means connecting said temperature changing means and each of said spaces, a source of power, temperature responsive means in each space, flow control means in each of said conduit means leading to each space, motor means for driving each of said flow control means, said motor means being controlled by its respective temperature responsive means, condition responsive switch means having an operating relationship to operate said changing means at a temperature depending upon condition indicative of heating load, an electric heater for setting said condition responsive means, a plurality of variable resistance means each of which is adjusted by its respective motor means in relation to the flow of a position of said flow control means, connection means including said variable resistance means for connecting said heater to said source of power whereby upon a decrease in flow of air to said spaces said heater is energized more to reset said changing means, a ventilation switch, relay means, means connecting said ventilation switch to control the energization of said relay means, circuit means connected to said relay means to connect one of said space temperature means to control said temperature changing means to transfer the system to a single space system and to simultaneously shunt said resistor to apply a maximum current to said heater whereby upon a transfer of the system back to a zone system said temperature changing means has a depressed temperature to prevent overshooting of the space temperature while said flow control means are readjusted depending upon said space temperature repsonsive means.

3. In a zone temperature control system, temperature changing means for supplying a quantity of conditioned air to a plurality of zones, a plurality of ducts connecting said temperature changing means and each of said zones, a source of power, temperature responsive means in each zone, flow control means in each of said duct means leading to each zone, motor means for driving each of said flow control means, said motor means being controlled by its respective temperature responsive means, heat scheduling switch means for normally operating said temperature changing means, a plurality of control means each of which is adjusted by its respective motor means in relation to the flow of a position of said flow control means, connection means including said control means for adjusting a control point of said scheduling means, a ventilation switch, and means connecting said ventilation switch to connect one of said space temperature means to control said temperature changing means to transfer the system to a single zone system and to depress said control point of said scheduling means whereby upon a transfer of the system back to a zone system said temperature changing means has a depressed temperature to prevent overshooting of the space temperature while said flow control means are readjusted depending upon said space temperature responsive means.

4. In a zone temperature control system, heat furnishing means for providing a supply of heated air, conduit means for individually connecting a plurality of zones to said heat furnishing means, individual control means for each of said conduit means for controlling the quantity of air delivered to each zone, heat scheduling means connected to said heat furnishing means to vary the temperature of said heated air in response to an environmental condition effecting the need of heat to said zones, a plurality of zone thermostats, circuit means connecting each of said thermostats to control said individual control means, circuit means for selectively connecting one of said thermostats to control said heat furnishing means for a single zone control system and to render said heat scheduling means ineffective.

References Cited in the file of this patent

UNITED STATES PATENTS

| | | |
|---|---|---|
| 2,789,767 | Martinson | Apr. 23, 1957 |
| 2,805,026 | Sparrow | Sept. 3, 1957 |